(12) United States Patent
Powell et al.

(10) Patent No.: US 9,738,460 B2
(45) Date of Patent: Aug. 22, 2017

(54) SYSTEMS AND METHODS FOR PROVIDING FEED MATERIAL TO A PRESSURIZED SYSTEM

(71) Applicant: SHELL OIL COMPANY, Houston, TX (US)

(72) Inventors: Joseph Broun Powell, Houston, TX (US); Robert Edward Trepte, Roswell, GA (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 14/868,448

(22) Filed: Sep. 29, 2015

(65) Prior Publication Data

US 2016/0096692 A1  Apr. 7, 2016

Related U.S. Application Data

(60) Provisional application No. 62/058,177, filed on Oct. 1, 2014.

(51) Int. Cl.
| | |
|---|---|
| *B65G 53/48* | (2006.01) |
| *B65G 53/30* | (2006.01) |
| *B65G 33/08* | (2006.01) |
| *B65G 65/40* | (2006.01) |
| *B01J 8/00* | (2006.01) |
| *B65G 53/12* | (2006.01) |

(52) U.S. Cl.
CPC ............ *B65G 53/30* (2013.01); *B01J 8/0015* (2013.01); *B01J 8/0035* (2013.01); *B65G 33/08* (2013.01); *B65G 53/12* (2013.01); *B65G 65/40* (2013.01); *B01J 2208/00752* (2013.01); *B01J 2208/00761* (2013.01)

(58) Field of Classification Search
USPC .......................................... 414/288, 307, 323
See application file for complete search history.

(56) References Cited

U.S. PATENT DOCUMENTS

| | | | |
|---|---|---|---|
| 3,729,105 A | 4/1973 | Huebler et al. | |
| 4,695,214 A | 9/1987 | Scinta | |
| 2011/0100274 A1 | 5/2011 | Kuske et al. | |

(Continued)

FOREIGN PATENT DOCUMENTS

DE    102010045917    3/2012

OTHER PUBLICATIONS

International Search Report dated Dec. 7, 2015 of PCT/US2015/052799 filed Sep. 29, 2015.

*Primary Examiner* — Saul Rodriguez
*Assistant Examiner* — Willie Berry, Jr.

(57) ABSTRACT

Methods and systems for transferring feed materials between zones having substantially different pressures, where the transfer can be continuous or semi-continuous. The methods and systems include a plurality of lock hoppers to receive feed material from a low pressure zone and pressurize it with fluid to a pressure of a high pressure zone. The pressurized material can be discharged to a circulation loop, which carries the pressurized material to one or more receiving unit(s) of a pressurized system. At least some feed material remains in the receiving unit(s) and at least a portion of the fluid exits to become part of the circulation loop. After discharge, the lock hoppers can be depressurized so the next pressurization cycle can begin with additional feed material. The lock hoppers can be operated in a time-staggered manner to provide continuous or semi-continuous transfer of material.

18 Claims, 1 Drawing Sheet

(56) References Cited

U.S. PATENT DOCUMENTS

| | | |
|---|---|---|
| 2011/0206469 A1 | 8/2011 | Furuyama et al. |
| 2012/0111416 A1 | 5/2012 | Kowoll et al. |
| 2013/0140168 A1 | 6/2013 | Koyama et al. |
| 2013/0170926 A1 | 7/2013 | Cartwright et al. |

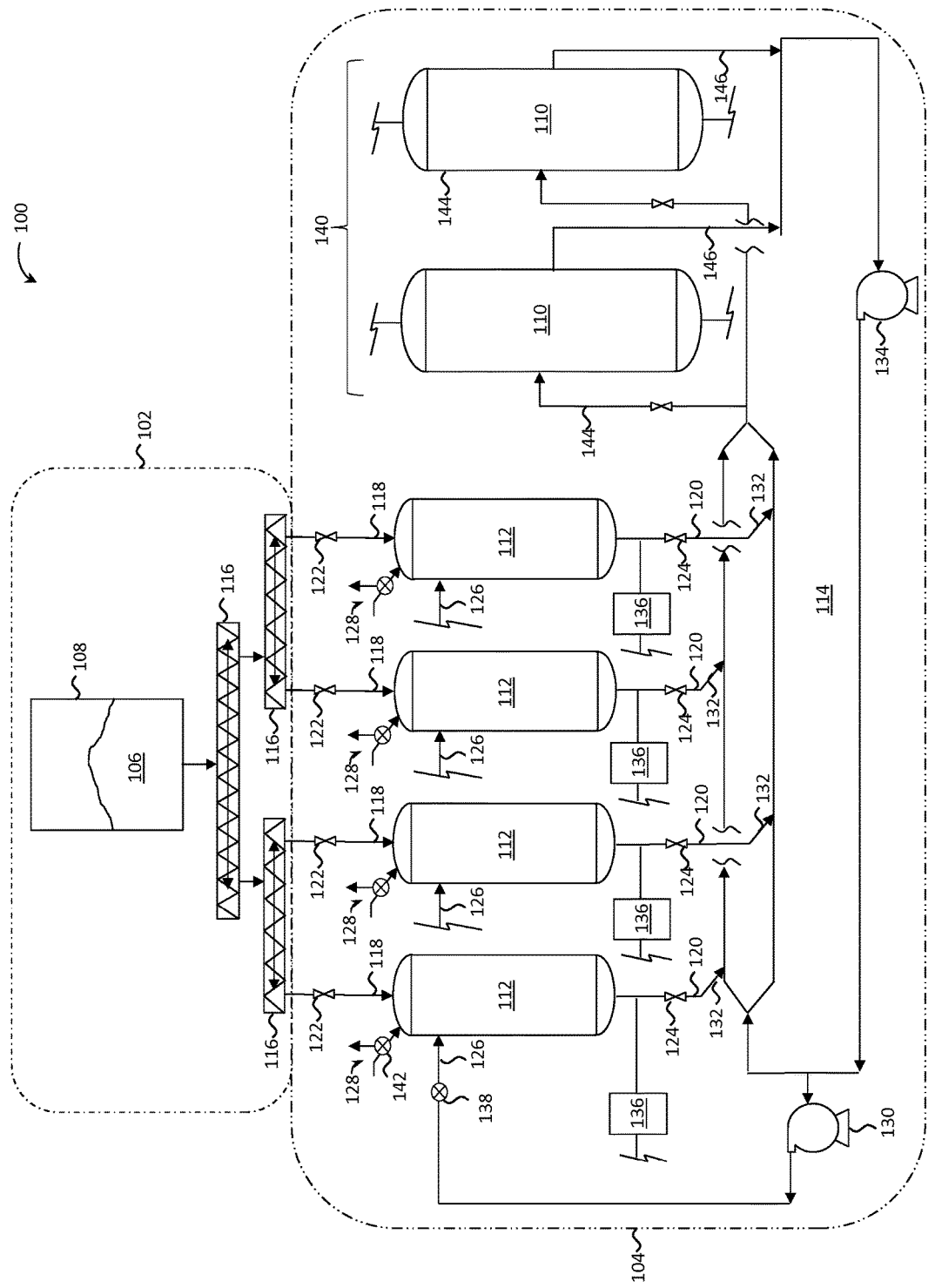

SYSTEMS AND METHODS FOR PROVIDING FEED MATERIAL TO A PRESSURIZED SYSTEM

The present application claims priority to U.S. Provisional Application No. 62/058,177, filed on Oct. 1, 2014, the disclosure of which is incorporated herein by reference in its entirety.

BACKGROUND OF THE INVENTION

This section is intended to introduce various aspects of the art, which may be associated with exemplary embodiments described in the present disclosure. This discussion is believed to assist in providing a framework to facilitate a better understanding of particular aspects described in the present disclosure. Accordingly, it should be understood that this section should be read in this light, and not necessarily as admissions of any prior art.

The present disclosure relates to systems and methods for providing materials, typically in solid forms, to a pressurized system. Specifically, the systems and methods of the present disclosure involve providing material to a pressurized system that can include more than one receiving unit.

A lock hopper is typically used in supplying coal to a coal gasification furnace. Generally, the coal is conveyed from a container to a lock hopper where the coal is pressurized by pressing an inert gas into the lock hopper. The coal is subsequently passed from the lock hopper to a gasifier with at least the same pressure as that in the gasifier. The coal is typically fed into the top of the gasifier using gravity.

While a plurality of lock hoppers have been employed, such as those disclosed in U.S. Pat. Nos. 3,729,105 and 4,695,214 and U.S. Patent Application Publication Nos. 2011/0206469 and 2011/0100274, these methods still do not efficiently provide material to a pressurized system, particularly one that contains more than one pressurized receiving unit. The present disclosure describes systems and methods that provide improvements for a more efficient feeding of materials to a pressurized system that can comprise one or more receiving units.

SUMMARY

The present disclosure generally relates to systems and methods for providing materials, typically in solid forms, to a pressurized system. Accordingly, there is provided a method for transferring material from a low pressure zone to a high pressure zone comprising: (a) providing feed material to a first lock hopper; (b) closing a valve coupled to an inlet of said first lock hopper; (c) after step (b), providing fluid to said first lock hopper to pressurize the first lock hopper to an operating pressure; (d) opening a valve coupled to an outlet of said first lock hopper, said outlet is in fluid communication with a circulation loop; (e) releasing content of the first lock hopper to the circulation loop, said circulation loop is in fluid communication with an inlet of a first receiving unit; (f) providing feed material to a second lock hopper; (g) closing a valve coupled to an inlet of said second lock hopper; (h) after step (g), providing fluid to said second lock hopper to pressurize the second lock hopper to said operating pressure; (i) opening a valve coupled to an outlet of said second lock hopper, said outlet is in fluid communication with the circulation loop; (j) releasing content of the second lock hopper to the circulation loop; and (k) providing content of the circulation loop to the first receiving unit.

The method can further comprise providing content of the circulation loop to a second receiving unit, wherein the circulation loop is in fluid communication with an inlet of the second receiving unit. Also, the method can comprise providing additional fluid to at least one of the first lock hopper and the second lock hopper to facilitate releasing of content of the respective lock hopper.

The method can further include (l) closing the valve coupled to the outlet of the first lock hopper; (m) releasing fluid from the first lock hopper; (n) allowing vapor to enter the first lock hopper to facilitate the releasing of fluid and depressurization of the first lock hopper; (o) closing the valve coupled to the outlet of the second lock hopper; (p) releasing fluid from the second lock hopper; and (q) allowing vapor to enter the second lock hopper to facilitate the releasing of fluid and depressurization of the second lock hopper.

Steps (a)-(e) and steps (l)-(n) can be performed at a different time from steps (f)-(j) and steps (o)-(q), respectively. For instance, steps (a)-(e) and steps (l)-(n) can be performed before steps (f)-(j) and steps (o)-(q), respectively.

The method can further comprise returning at least a portion of the fluid from at least one of the first receiving unit and the second receiving unit (if present) to the circulation loop. The first receiving unit and the second receiving unit (if present) can be in parallel with one another.

Fluid provided to at least one of the first lock hopper and the second lock hopper can comprise fluid from the circulation loop. Fluid provided to at least one of the first lock hopper and the second lock hopper can comprise fluid added to at least one of the first receiving unit and the second receiving unit (if present) from a source other than the circulation loop.

According to other aspects, the present disclosure provides a system comprising: a first lock hopper and a second lock hopper, where each lock hopper comprises: an inlet valve; an outlet valve; and a fluid inlet. The system further comprises a circulation loop in fluid communication with the outlet valve of each lock hopper; a first receiving unit comprising an inlet in fluid communication with the circulation loop to receive material from the circulation loop and an outlet in fluid communication with the circulation loop to provide fluid to the circulation loop.

The system can further comprise a second receiving unit, where second receiving unit comprises: an inlet in fluid communication with the circulation loop to receive material from the circulation loop; and an outlet in fluid communication with the circulation loop to provide fluid to the circulation loop. The system can also comprise at least one conveyor to deliver feed material to the first lock hopper and the second lock hopper. The conveyor can be a screw conveyor.

The features and advantages of embodiments provided by the present disclosure will be readily apparent to one having ordinary skill in the art upon a reading of the description of the embodiments that follows.

BRIEF DESCRIPTION OF THE DRAWING

The following FIGURE is included to illustrate certain aspects of the present disclosure, and should not be viewed as an exclusive embodiment. The subject matter disclosed is capable of considerable modifications, alterations, combinations, and equivalents in form and function, as will occur to one having ordinary skill in the art and the benefit of this disclosure.

FIG. 1 shows a schematic of a first illustrative embodiment for providing materials to a pressurized system according some aspects provided by this disclosure.

DETAILED DESCRIPTION

The present disclosure generally provides methods and systems for providing material, typically in solid form, such as particulates, to a pressurized system. Non-limiting preferred aspects of embodiments disclosed by the present disclosure are further discussed with reference to FIG. 1, which illustrates system 100 having low pressure zone 102 and high pressure zone 104. Certain features such as, but not limited to, pumps, valves, gas bleeds, gas inlets, fluid inlets, fluid outlets, heaters, heat exchangers, and the like have not necessarily been depicted in the FIGURES, but their presence and function will be understood by one having ordinary skill in the art.

Low pressure zone 102 and high pressure zone 104 depict items that have different pressures where items in low pressure zone 102 have a pressure that is lower than a pressure of items in high pressure zone 104. System 100 can provide feed material 106 in storage bin 108 in low pressure zone 102 to receiving units 110 of pressurized system 140 in high pressure zone 104 using two or more lock hoppers 112 and circulation loop 114, which is in fluid communication with both lock hoppers 112 and receiving units 110. Lock hoppers 112 provide a transition between a pressure of low pressure zone 102 for loading of feed material 106 and a pressure of high pressure zone 104 for subsequently providing feed material at a pressure higher than the pressure it was at before. While FIG. 1 shows pressurized system 140 comprising two receiving units 110 in fluid communication with circulation loop 114 to receive feed material from low pressure zone 102, it is understood that pressurized system 140 can have any number of receiving units 110 in fluid communication with circulation loop 114, such as one or more than two. If more than one receiving units 110 are employed, they can be arranged in parallel to one another where fluid from circulation loop 114 is distributed to an inlet of each receiving unit 110.

Feed material 106 in low pressure zone 102 has a pressure that is lower than an operating pressure of pressurized system 140. Feed material 106 is preferably in solid form, particularly particulates. For convenience purposes, feed material 106 not in storage bin 108 is not explicitly depicted in FIG. 1. Items in low pressure zone 102 can have any pressure lower than a pressure of items in high pressure zone 104. In other words, items in high pressure zone 104 can have any pressure higher than a pressure of items in low pressure zone 102. For instance, a pressure of items in low pressure zone 102 can be in a range of about 0.1 bar absolute to 10 bar absolute, and a pressure of items in high pressure zone 104 can be in a range of greater than 10 bar absolute to 250 bar absolute.

Feed material 106 can be provided to storage bin 108 in any suitable fashion, and the amount of solid material 106 in storage bin 108 can be maintained as desired. As shown in FIG. 1, feed material 106 can be provided to lock hoppers 112 via a plurality of (two or more) conveyors 116. While FIG. 1 shows conveyors 116 preferably as screw conveyors, it is understood that any suitable conveyor can be used to transfer feed material 106 from storage bin 108 to lock hoppers 112. Additional non-limiting examples of suitable conveyors include belt conveyors, gravity flow chutes, and diverter gates. Other illustrative examples of conveyors include pneumatic transport using the motive force of a fluid, or mechanical transport via rotating screws, augers or conveyors, as shown. Vibrating components may be used to augment the transfer of material to lock hoppers 112 and prevent bridging.

FIG. 1 shows more than one conveyor 116 may be used to transfer feed material 106 from storage bin 108 to lock hoppers 112. Nevertheless, it is understood that the suitable number and size of conveyors 116 can be selected by one of ordinary skill in the art for a particular system based on operating parameters, such as capacity, sequencing, and throughput rate requirements. For instance, while FIG. 1 shows one conveyor 116 feeding to two lock hoppers 112, it is understood that a conveyor can be associated with any number of lock hoppers. As an example, each lock hopper 112 can have its own conveyor 116 or two, three, or more lock hoppers 112 can be fed by one conveyor 116. Another example may involve one conveyor 116 between storage bin 108 and lock hopper 112 as compared to the two conveyors 116 shown in FIG. 1; or it may involve three or more conveyors 116 between storage bin 108 and lock hopper 112.

Referring to FIG. 1, system 100 includes a plurality of (two or more) lock hoppers 112 to pressurize the feed material to a higher pressure, preferably the same pressure as that of high pressure zone 104. After pressurization, the feed material can be provided to receiving units 110 via circulation loop 114 and line 144 at a higher pressure, preferably at an operating pressure of receiving units 110.

As shown in FIG. 1, lock hoppers 112 are arranged in parallel with one another where a conveyor 116 has access to each lock hopper 112 via inlet 118 to provide feed material 106 from storage bin 108, and each lock hopper 112 is in fluid communication with circulation loop 114 via outlet 120 to discharge its content of pressurized material. Coupled to each inlet 118 is entrance valve 122, which can be in an opened position to provide feed material to each lock hopper 112 or in a closed position to prevent additional feed material from entering each lock hopper 112. Coupled to each outlet 120 is exit valve 124, which can be in an opened position to allow pressurized feed material to exit each lock hopper 112 or in a closed position to keep feed material in each lock hopper 112.

The following description refers to a single lock hopper 112; however, it is understood that the description is applicable for other lock hoppers 112. To fill one lock hopper 112 with feed material 106, exit valve 124 of that lock hopper is closed and the entrance valve 122 is opened. When lock hopper 112 is filled with a desired amount of feed material, entrance valve 122 of that lock hopper is closed. With both valves 122 and 124 closed, lock hopper 112 can now be pressurized by introduction of fluid via fluid inlet 126. Fluid flow control 138 coupled to fluid inlet 126 can control the amount and timing of fluid going into one or more lock hoppers 112, including allowing or preventing fluid from entering one or more lock hoppers 112. That is, any combination of each fluid inlet 126 having its own fluid flow control 138 or a single fluid flow control 138 controlling more than one fluid inlet 126, including all fluid inlets 126, is possible. Fluid flow control 138 can be any suitable mechanism known to one or ordinary skill in the art, such as a valve system. As fluid enter lock hopper 112 and pressure increases, vapor in lock hopper 112 can be vented via vapor port 128, which allows vapor to leave lock hopper 112 during pressurization and enter lock hopper 112 during depressurization. Vapor port 128 can also have fluid flow control 142 that regulates the amount and timing of vapor entering or exiting each lock hopper 112 during pressurization or depressurization. Fluid flow control 142 can be any suitable mechanism known to one or ordinary skill in the art, such as a valve system. For simplicity, only fluid flow control 142 of the first vapor port 128 is labeled, but it is understood that each lock hopper 112 can have its own fluid flow control 142. Additionally or alternately, one fluid flow control 142 can control more than one vapor port 128, including all vapor ports 128.

Any suitable fluid can be used to pressurize lock hopper 112, including one selected from a liquid, gas, supercritical fluid, and any combination thereof. Pressurization fluid can also include fluid from one or more receiving units 110, where fluid from one or more receiving units 110 has been provided to receiving units 110 in addition to fluid from circulation loop 114.

Pressurization fluid is provided to lock hopper 112, preferably by pressure change device 130, until the desired pressure is achieved. While only one pressure change device 130 is shown, it is understood that more than one pressure change device 130 can be employed to achieve the desired pressure as known to one of ordinary skill in the art. Pressure change device 130 can be any suitable device that provides a pressure change between its inlet and its outlet. Suitable pressure change device includes, but not limited to, a pump or compressor. At least a portion of the fluid can come from circulation loop 114 and provided to lock hopper 112 via pressure change device 130. Additionally or alternately, while not shown, it is understood that fluid for pressurization can come from another source other than circulation loop 114. For instance, at least one of a vapor, a liquid, a supercritical liquid, and any combination thereof can be provided separately to a lock hopper 112. Additionally or alternatively, at least one lock hopper 112 can be prefilled with at least one of a vapor, a liquid, a supercritical liquid, and any combination thereof before feed material 106 is provided to that lock hopper 112 and additional pressurization fluid is added. Fluid provided to lock hoppers 112 via fluid inlet has a pressure that is greater than or equal to the pressure in circulation loop 114.

Once a desired pressure is achieved in lock hopper 112, such as at least an operating pressure of pressurized system 140, exit valve 124 is opened and entrance valve 122 remains closed. Circulation loop 114 preferably has a pressure that is the same or substantially the same (such as within about a 5% difference) as that of receiving units 110 and lock hoppers 112 when pressurized. With the pressurized content of lock hopper 112 having substantially the same pressure as that of circulation loop 114, discharge of the content of lock hopper 112 can be challenging. As such, discharge of the content of lock hopper 112 may be facilitated by feeding of additional fluid into lock hopper 112 to push the content out of lock hopper 112 and into circulation loop 114. The additional fluid may be provided via fluid inlet 126 or via another inlet (not shown). Additional fluid may be provided until feed materials in lock hopper 112 are sufficiently flushed out into circulation loop 114. In a particular embodiment, optionally, another way to facilitate discharge of lock hopper 112 can be through use of the Venturi effect, which is depicted in FIG. 1 as angled section 132 between outlet 120 and circulation loop 114, to provide a pulling force on the material in lock hopper 112. Any other suitable means known to one of ordinary skill in the art can also be used to facilitate in pulling pressurized material from lock hopper 112 into circulation loop 114.

As shown, once the pressurized content of lock hoppers 112 enters circulation loop 114, it is carried by the flow of circulation loop 114 to line 144 to receiving units 110. The pressurized material in circulation loop 114 may be delivered to receiving units 110 via line 144 at any suitable location, such as at the top or bottom of receiving units 110 or any position in between (as shown) thereof. Receiving units 110 can have other inlet(s) or outlet(s) through which additional material can be added to or removed from receiving units 110 and routed elsewhere as needed or desired.

As shown in FIG. 1, at least a portion of fluid that exits receiving units 110 via line 146 and returns to complete circulation loop 114, the flow of which carries pressurized content from lock hoppers to receiving units 110. The flow of circulation loop 114 is maintained by pressure change device 134. Pressure change device 134 can be any suitable device that provides a pressure change between its inlet and its outlet. It is understood that any suitable number of pressure change device 134, such as one or more, may be employed to achieve a desired flow of circulation loop 114. Suitable pressure change devices include, but not limited to, a pump or compressor. At least some pressurized feed material fed to receiving units 110 remain in receiving units 110 for further processing rather than exit with the returning fluid of circulation loop 114 via line 146. The amount of feed material in the fluid exiting receiving units 110 via line 146 is preferably less than the amount of feed material in the fluid entering receiving units 110 via line 144. This can be achieved through a separation mechanism (not shown) such as a solids/liquids separation device like a screen or filter or other suitable mechanisms, such as gravity or cyclone separation. The material leaving receiving units 110 may exit via line 146 from any suitable location, such as at the top or bottom of receiving units 110 or any position in between (as shown) thereof.

As described, circulation loop 114 delivers the feed material and accompanying fluid to receiving units 110 at the pressure level achieved in lock hopper 112. It can be seen that system 100, particularly through circulation loop 114, can provide pressurized feed material to one receiving unit 110, or it can allow for simultaneous feeding of pressurized material to more than one receiving units 110. It can also be seen that system 100, particularly through circulation loop 114, allows for a continuous or semi-continuous flow of feed material from individual lock hoppers 112, which can be discharged in a particular sequence to achieve continuous or semi-continuous inlet distributions to one or more receiving units. As used herein, the term "continuous" and grammatical equivalents thereof will refer to a process in which feed material is added to a receiving unit in an uninterrupted manner without fully depressurizing the receiving unit. As used herein, the term "semi-continuous" and grammatical equivalents thereof will refer to a discontinuous, but as-needed, addition of feed material to a receiving unit without fully depressurizing the receiving unit.

After pressurized material has been discharged from lock hopper 112, exit valve 124 is closed, and depressurization of lock hopper 112 can take place so the cycle of filling, pressurizing, discharging, and depressurizing can be repeated. Depressurization involves dropping the pressure of the particular lock hopper 112 slated for depressurization and releasing of sufficient liquid, if present, to make physical space for the next batch of feed material 106. Decreasing of pressure can be achieved by releasing of fluid from that lock hopper 112. If liquid is used, with both entrance valve 122 and exit valve 124 in a closed position, liquid can be released to containment unit 136. If needed, vapor can also be vented through vapor port 128 or vapor can be allowed to enter that lock hopper 112 to allow release of liquid to containment unit 136. All or some of the fluid in the lock hopper 112 can be released. As such, some fluid such as liquid may remain in the lock hopper 112 after depressurization when the next batch of feed material 106 is added. After depressurization is completed, entrance valve 122 can be opened to allow lock hopper 112 to be filled and exit valve 124 remains closed.

As mentioned, system 100 can provide continuous or semi-continuous feeding of pressurized material to more than one receiving units 110 while each lock hopper 112 is operated in batch mode. For instance, a first lock hopper 112 can have its operation sequence of filling, pressurizing, discharging, and depressurizing initiated first. After a determined amount of time, a second lock hopper 112 has its operation sequence initiated. As each lock hopper 112 completes its operation sequence and repeats the cycle, the pressurized material is introduced to circulation loop 114 in a time-staggered manner. Additional lock hoppers 112 can be added to reduce the amount of time between discharges of pressurized material from lock hoppers 112 to circulation loop 114 to reach a continuous or semi-continuous level. For example, a first lock hopper 112 can be in the filling step while a second lock hopper 112 is in the pressurizing step, a third lock hopper 112 is in the discharging step, and a fourth lock hopper 112 is in the depressurizing step. That way, as the third lock hopper 112 completes discharging its content and transitions into depressurization, the second lock hopper 112 can begin its discharge of pressurized material. Additional lock hoppers 112 can be added in parallel so that two or more lock hoppers 112 can overlap in any one or more steps of the sequence of filling, pressurizing, discharging, and depressurizing. It is understood that the number, size, and cycle time of the lock hoppers can be manipulated to achieve the desired frequency and overall rate of material discharge. The number and size of the lock hoppers can vary depending on the material throughput needed by the overall system. Also, lock hoppers 112 may be of any suitable designs and material for the operating conditions. It is understood that lock hoppers 112 are equipped with nozzles, shutoff and control valves according to the state of the art which serve to control the flow of feed material, to depressurize and pressurize or carry out pressure compensation.

Various components of system 100 may be arranged to take advantage of gravity to assist the flow of material. For example, storage bin 108 may be positioned at a higher elevation than one or more conveyors 116, which in turn may be positioned at a higher elevation than one or more lock hoppers 112. Likewise, lock hoppers 112 may be positioned at a higher elevation than containment unit 136 and/or circulation loop 114.

In a preferred embodiment, valves 122 and 124 and fluid flow control valve 138, as well as pressure change device 130, can be controlled by a program that coordinates their operation. For example, the program first operates one or more inlet valves 122 and one or more conveyors 116 as needed to feed a desired amount of feed material into the respective lock hopper(s) 112 in the desired timed sequence to provide the rate of discharge of pressurized material into circulation loop 114. Closing of entrance valve 122 after the desired amount of feed material 106 has been provided to the respective lock hopper 112 may send a signal to the program to start pressure change device 130 and fluid flow control valve 138 to initiate the pressurization step. It may be preferable to have a pressure sensor associated with the respective lock hopper(s) 112 to provide signals to the program to begin venting vapor, if not already achieved by other means, and continue to provide fluid into the respective lock hopper 112 until the programmed pressure is reached. When the established pressure is reached, the program can open exit valve 124 to permit pressurized material to enter circulation loop 114 with the continued introduction of fluid by pressure change device 130. After an established amount of time or by other means indicating the pressurized material has been sufficiently discharged, the program can close exit valve 124 and operate any other necessary component(s) to cease introduction of fluid into lock hopper 112. The program can then operate to release the remaining fluid in lock hopper 112 to the respective containment unit 136 and allow vapor to enter lock hopper 112, if it is not achieved by other means. The pressure sensor can provide a signal when depressurization is completed so that entrance valve 122 can be opened for the next cycle. The program can be used to coordinate the operation of multiple lock hoppers 112 so that a continuous or semi-continuous supply of pressurized material can be provided to circulation loop 114 to one or more receiving units, where the distribution can be done simultaneously.

As can be seen, the methods and systems provided herein are suitable for use to provide continuous or semi-continuous transfer of feed materials, such as particulates, from a low pressure to a system operating at high pressure, i.e., a pressurized system. For instance, the ability to provide feed material to a pressurized system as described herein, including using a circulation loop to receive time-staggered discharge of material from more than one pressure hoppers and to deliver the material a pressurized system allows for maintenance of desired concentrations of materials provided to the pressurized system. The delivery of material to the pressurized system as described herein can be free from fluctuations in concentration that would occur if delivery is performed by other conventional systems.

Any suitable material of any size, shape, or form, particularly particulate materials, can be feed material used with the methods and systems provided herein. The feed materials may be natively present in any sizes, shapes, or forms, or they may be further processed prior to being provided to lock hoppers 112. For instance, the feed material may be pretreated or conditioned prior to being fed to lock hoppers 112. While any type of suitable materials, particularly in solid form, including particulates, may be used, preferred suitable feed materials may include cellulosic biomass material, such as, forestry residues, agricultural residues, herbaceous material, municipal solid wastes, waste and recycled paper, pulp and paper mill residues, and any combination thereof. Thus, in some embodiments, a suitable feed material may include, for example, corn stover, straw, bagasse, miscanthus, sorghum residue, switch grass, bamboo, water hyacinth, hardwood, hardwood chips, hardwood pulp, softwood, softwood chips, softwood pulp, duckweed and any combination thereof. Leaves, roots, seeds, stalks, husks, and the like may be used as a source of feed material. Common sources of cellulosic biomass feed material may include, for example, agricultural wastes (e.g., corn stalks, straw, seed hulls, sugarcane leavings, nut shells, and the like), wood materials (e.g., wood or bark, sawdust, timber slash, mill scrap, and the like), municipal waste (e.g., waste paper, yard clippings or debris, and the like), and energy crops (e.g., poplars, willows, switch grass, alfalfa, prairie bluestream, corn, soybeans, and the like).

Therefore, embodiments described in the present disclosure are well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods may also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method for transferring material from a low pressure zone to a high pressure zone comprising:
   (a) providing feed material to a first lock hopper,
   (b) closing a valve coupled to an inlet of said first lock hopper;
   (c) after step (b), providing fluid to said first lock hopper to pressurize the first lock hopper;
   (d) after the first lock hopper is pressurized, opening a valve coupled to an outlet of said first lock hopper;
   (e) releasing pressurized content comprising fluid and feed material from the first lock hopper to a circulation loop via said outlet, which is in fluid communication with said circulation loop;
   (f) providing feed material to a second lock hopper,
   (g) closing a valve coupled to an inlet of said second lock hopper;
   (h) after step (g), providing fluid to said second lock hopper to pressurize the second lock hopper,
   (i) opening a valve coupled to an outlet of said second lock hopper,
   (j) releasing pressurized content comprising fluid and feed material from the second lock hopper to the circulation loop via said outlet, which is in fluid communication with said circulation loop;
   (k) providing at least a portion of pressurized content in the circulation loop to a first receiving unit via an inlet of the first receiving unit, said inlet is in fluid communication with the circulation loop;
   (l) providing at least a portion of fluid from the first receiving unit to the circulation loop via an outlet of the first receiving unit, said outlet is in fluid communication with the circulation loop;
   wherein the circulation loop comprises a direction of flow of material from the outlet of the first lock hopper and the outlet of the second lock hopper to the inlet of the first receiving unit and from the outlet of the first receiving unit to the outlet of the first lock hopper and the outlet of the second lock hopper;
   (m) closing the valve coupled to the outlet of the first lock hopper;
   (n) releasing fluid from the first lock hopper to a containment unit to depressurize the first lock hopper;
   (o) closing the valve coupled to the outlet of the second lock hopper, and
   (p) releasing fluid from the second lock hopper to a containment unit to depressurize the second lock hopper.

2. The method of claim 1 further comprising:
   providing at least a portion of pressurized content of the circulation loop to a second receiving unit via an inlet of the second receiving unit, said inlet is in fluid communication with the circulation loop.

3. The method of claim 2 further comprising:
   providing at least a portion of fluid from the second receiving unit to the circulation loop via an outlet of the second receiving unit, said outlet is in communication with the circulation loop,
   wherein the circulation loop comprises a direction of flow of material from the outlet of the first lock hopper and the outlet of the second lock hopper to the inlet of the first receiving unit and from the outlet of the first receiving unit and the outlet of the second receiving unit to the outlet of the first lock hopper and the outlet of the second lock hopper.

4. The method of claim 2 wherein the first receiving unit and the second receiving unit are in parallel with one another.

5. The method of claim 2 further comprising:
   simultaneously providing at least a portion of pressurized content in the circulation loop to the inlet of the first receiving unit and the inlet of the second receiving unit.

6. The method of claim 2 further comprises:
   releasing the pressurized content of the first lock hopper to the circulation loop in step (e) at a different time than releasing the pressurized content of the second lock hopper to the circulation loop in step (j); and
   continuously providing at least a portion of pressurized content in the circulation loop to the first receiving unit and the second receiving unit.

7. The method of claim 2 further comprises:
   releasing the pressurized content of the first lock hopper to the circulation loop in step (e) at a different time than releasing the pressurized content of the second lock hopper to the circulation loop in step (j); and
   semi-continuously providing at least a portion of pressurized content in the circulation loop to the first receiving unit and the second receiving unit.

8. The method of claim 1 further comprising:
   providing additional fluid to at least one of the first lock hopper and the second lock hopper to facilitate releasing of pressurized content of the respective lock hopper.

9. The method of claim 8 wherein the additional fluid provided to at least one of the first lock hopper and the second lock hopper comprises fluid from the circulation loop.

10. The method of claim 1 further comprising:
    (q) allowing vapor to enter the first lock hopper to facilitate the releasing of fluid of the first lock hopper;

(r) allowing vapor to enter the second lock hopper to facilitate the releasing of fluid of the second lock hopper.

11. The method of claim 10 wherein steps (a)-(e) and steps (m)-(o) are performed at a different time from steps (f)-(j) and steps (p)-(r), respectively.

12. The method of claim 11 wherein steps (a)-(e) and steps (m)-(o) are performed before steps (f)-(j) and steps (p)-(r), respectively.

13. The method of claim 1 wherein at least one of step (c) and (h) further comprises:
providing fluid from the circulation loop to at least one of the first lock hopper and the second lock hopper.

14. The method of claim 1 further comprises:
releasing the pressurized content of the first lock hopper to the circulation loop in step (e) at a different time from releasing the pressurized content of the second lock hopper to the circulation loop in step (j); and
continuously providing at least a portion of pressurized content in the circulation loop to the first receiving unit.

15. The method of claim 1 further comprises:
releasing the pressurized content of the first lock hopper to the circulation loop in step (e) at a different time than releasing the pressurized content of the second lock hopper to the circulation loop in step (j); and
semi-continuously providing at least a portion of pressurized content in the circulation loop to the first receiving unit.

16. The method of claim 1 wherein the fluid from the first receiving unit provided to the circulation loop in step (L) comprises feed material in the pressurized content provided to the first receiving unit in step (k).

17. The method of claim 16 wherein, in the circulation loop, feed material from the first lock hopper and the second lock hopper is in contact with feed material from the first receiving unit.

18. The method of claim 1 wherein, in the circulation loop, feed material from the first lock hopper and the second lock hopper is in contact with fluid from the first receiving unit.

* * * * *